(12) United States Patent
Baik

(10) Patent No.: US 10,941,903 B2
(45) Date of Patent: Mar. 9, 2021

(54) BELLOWS-TYPE STEAM TRAP

(71) Applicant: TSK CO., LTD., Seongnam-si (KR)

(72) Inventor: Changki Baik, Seoul (KR)

(73) Assignee: TSK CO., LTD., Seongnam-si (KR)

( * ) Notice: Subject to any disclaimer, the term of this patent is extended or adjusted under 35 U.S.C. 154(b) by 0 days.

(21) Appl. No.: 15/780,209

(22) PCT Filed: Nov. 25, 2016

(86) PCT No.: PCT/KR2016/013702
§ 371 (c)(1),
(2) Date: May 30, 2018

(87) PCT Pub. No.: WO2017/095080
PCT Pub. Date: Jun. 8, 2017

(65) Prior Publication Data
US 2018/0356036 A1 Dec. 13, 2018

(30) Foreign Application Priority Data
Dec. 1, 2015 (KR) .......................... 10-2015-0169711

(51) Int. Cl.
*F16T 1/14* (2006.01)
*F16K 1/36* (2006.01)
(Continued)

(52) U.S. Cl.
CPC .................. *F16T 1/14* (2013.01); *F16K 1/36* (2013.01); *F16K 31/002* (2013.01); *F16T 1/06* (2013.01);
(Continued)

(58) Field of Classification Search
CPC ..... F16T 1/14; F16T 1/06; F16T 1/386; F16T 1/10; F16K 1/36; F16K 31/002; F16K 17/087; F16K 31/145; F16K 31/165; F16K 31/385; F16K 31/3855; F16K 31/1266; F16K 41/10–25; F16K 5/207; Y10T 137/3003–3105; Y10T 137/7836; Y10T 137/87981; Y10T 137/8049;
(Continued)

(56) References Cited

U.S. PATENT DOCUMENTS 1,366,473 A * 1/1921 Mallory ................. B21D 51/12
92/47
1,483,902 A * 2/1924 Mallory ................. F24D 19/081
236/58

(Continued)

FOREIGN PATENT DOCUMENTS

JP 2008-020046 A 1/2008
KR 20-1974-0001380 Y1 12/1974
(Continued)

*Primary Examiner* — Craig J Price
(74) *Attorney, Agent, or Firm* — Maschoff Brennan

(57) ABSTRACT

The present invention relates to a bellows-type steam trap that comprises: a steam trap body having an inflow port formed at one side thereof, to which an inflow pipe is connected, and a discharge port formed at the other side thereof, to which a discharge pipe is connected, wherein a channel through which steam passes is formed between the inflow port and the discharge port; and a valve body which is installed in the steam trap body and can expand or contract to open or close the channel.

7 Claims, 4 Drawing Sheets

(51) Int. Cl.
*F16T 1/06* (2006.01)
*F16K 31/00* (2006.01)
*F16T 1/38* (2006.01)
*F16T 1/10* (2006.01)

(52) U.S. Cl.
CPC ................ *F16T 1/386* (2013.01); *F16T 1/10* (2013.01); *Y10T 137/304* (2015.04)

(58) Field of Classification Search
CPC ........... Y10T 137/304; Y10T 137/2557; Y10T 137/3331; Y10T 137/5109; Y10T 137/5283; Y10T 137/6154; Y10T 137/7504; Y10T 137/7559; Y10T 137/7613; Y10T 137/7668; Y10T 137/7934; Y10T 137/7929; Y10T 137/794; Y10T 137/80; Y10T 137/13; F16N 39/00; G05D 7/0106; F25B 41/043; Y10S 277/916; Y10S 148/072
USPC ....... 137/171–204, 107, 218, 269, 271, 327, 137/454.2, 454.6, 543.13, 543.19, 543.23; 236/56, 59, 99 R, 93 R, 58; 184/6.13, 184/104.1
See application file for complete search history.

(56) References Cited

U.S. PATENT DOCUMENTS

| | | | | |
|---|---|---|---|---|
| 1,508,983 A * | 9/1924 | Miller | .............. | F24D 19/081 236/58 |
| 1,587,560 A * | 6/1926 | Snediker | .............. | F24F 6/12 236/44 C |
| 1,816,142 A * | 7/1931 | Clifford | .............. | F24D 19/081 236/56 |
| 1,846,226 A * | 2/1932 | Smith | .............. | F24D 19/081 236/56 |
| 1,911,230 A * | 5/1933 | Jones | .............. | G05D 23/123 236/58 |
| 1,976,730 A * | 10/1934 | Irwin | .............. | F16T 1/10 159/DIG. 13 |
| 2,279,285 A * | 4/1942 | Worth | .............. | F16N 39/00 236/34.5 |
| 2,314,892 A * | 3/1943 | Papulski | .............. | F24F 6/18 126/113 |
| 2,513,875 A * | 7/1950 | Johnson | .............. | F16T 1/10 236/56 |
| 2,617,621 A * | 11/1952 | Hobbs | .............. | F16K 41/10 251/273 |
| 2,652,980 A * | 9/1953 | St Clair | .............. | F16T 1/10 236/56 |
| 3,186,641 A * | 6/1965 | Goodman | .............. | B01D 5/0081 236/40 |
| 3,197,141 A * | 7/1965 | Johnson | .............. | F16T 1/10 236/56 |
| 3,278,156 A * | 10/1966 | Callahan, Jr. | .............. | F16K 41/10 251/335.1 |
| 3,288,367 A * | 11/1966 | Monroe, Jr. | .............. | F16T 1/10 236/56 |
| 3,302,878 A * | 2/1967 | Katsuji | .............. | F16T 1/10 236/56 |
| 3,620,449 A * | 11/1971 | Gerhard Hohn | .............. | F16T 1/10 236/56 |
| 3,642,201 A * | 2/1972 | Potchen | .............. | B01F 3/04007 137/193 |
| 3,876,139 A * | 4/1975 | Schmidt, Jr. | .............. | F16T 1/10 236/56 |
| 3,990,680 A * | 11/1976 | Massey, Jr. | .............. | F16K 1/38 251/319 |
| 4,134,541 A * | 1/1979 | Beatty | .............. | F16T 1/02 137/182 |
| 4,288,032 A * | 9/1981 | Hetz | .............. | F16T 1/10 137/183 |
| 4,509,721 A * | 4/1985 | Lassally | .............. | F16K 31/44 251/256 |
| 4,515,344 A * | 5/1985 | Gemignani | .............. | F16K 41/10 251/63.5 |
| 4,522,219 A * | 6/1985 | Ohkata | .............. | E03B 7/12 116/218 |
| 4,526,341 A * | 7/1985 | Thomas | .............. | F16K 51/02 251/335.3 |
| 4,549,691 A * | 10/1985 | Jiandani | .............. | G05D 23/123 236/58 |
| 4,623,091 A | 11/1986 | Stein | | |
| 4,679,727 A * | 7/1987 | Alesson | .............. | F16T 1/10 236/56 |
| 4,745,943 A * | 5/1988 | Mortensen | .............. | B01D 45/04 137/177 |
| 4,804,164 A * | 2/1989 | Nakazawa | .............. | F16K 31/52408 251/335.3 |
| 4,941,504 A * | 7/1990 | Beauvir | .............. | F16K 1/02 137/524 |
| 4,995,589 A * | 2/1991 | Adishian | .............. | F16K 31/1221 251/335.3 |
| 5,351,936 A * | 10/1994 | Tanikawa | .............. | F16K 41/10 251/122 |
| 5,634,627 A * | 6/1997 | Daido | .............. | F16K 41/10 251/335.3 |
| 5,678,803 A * | 10/1997 | Shinohara | .............. | F16K 7/14 251/368 |
| 7,011,295 B2 * | 3/2006 | Kajitani | .............. | G05D 16/0619 251/335.3 |
| 9,121,549 B2 * | 9/2015 | Mawby | .............. | F16T 1/34 |
| 9,200,752 B2 * | 12/2015 | Vivian | .............. | F16T 1/14 |

FOREIGN PATENT DOCUMENTS

| | | |
|---|---|---|
| KR | 20-1988-003535 Y1 | 3/1987 |
| KR | 10-0635332 B1 | 10/2006 |
| KR | 10-2008-0076148 A | 8/2008 |
| KR | 20-2007-0004408 U | 10/2008 |
| KR | 10-2010-0047438 A | 5/2010 |

* cited by examiner

BELLOWS-TYPE STEAM TRAP

TECHNICAL FIELD

The present invention relates to a bellows-type steam trap, and more specifically, to a bellows-type steam trap capable of not only automatically opening/closing a channel for condensate water, gas etc. by means of the sensible heat of condensate water, but also preventing rupture in the winter.

RELATED ART

In general, a steam trap is used for a heat exchanger and is a device such as an automatic valve, which is designed to efficiently remove condensate water generated from condensed steam in a drum or a pipe and to block steam from leaking.

A conventional steam trap has a bucket formed to move by means of steam and condensate water in a head part, the bucket has a vent formed at one side of the upper portion thereof so as to block a discharge port of the upper portion by means of the strength of steam flowing into, and when the steam is discharged from the vent, the discharge port is opened by means of the self-weight of the bucket, and the process described above is repeated periodically to discharge steam and condensate water.

When condensate water is generated in a pipe line, a steam trap is configured to discharge the condensate water, but the conventional steam trap described above, where a bucket is formed in a head part 21, periodically repeat the process without condensate water, and is configured to discharge condensate water even only by means of the shake of the bucket even though condensate water is inside the steam trap, thereby causing large amounts of steam to leak.

For instance, steam is leaked from the chimney of a laundry because there is a problem with a bucket-type steam trap, and when the steam pressure of a boiler is set, a boiler continuously needs to operate due to steam loss in a conventional bucket-type steam trap, thereby causing a massive amount of energy loss such as gas, electricity, water etc. necessary to operate a boiler.

Further, when a boiler continues to operate, the lifespan of the boiler and its peripheral devices are reduced, and a boiler having a larger capacity is used.

To solve the problems of the bucket-type steam trap, a float-type steam trap has been developed and used. For instance, U.S. Pat. No. 4,623,091 has an inflow port and a discharge port formed at a right angle such that condensate water flows inside the machine or at the lower portion of a steam pipe to move and gather in the steam trap and then discharge by means of self-weight.

Such a bucket-type steam trap may not be used when the height of the machine is low, has a complex pipe in a pipe line for discharge, has problems with exact sealing because the structure in which a valve plug closes a discharge port is irrational, and has a larger steam trap compared to its capacity because a float needs to stay away from a pin (hinge) to obtain buoyance exceeding the weight of a valve plug, an arm, a float etc., and therefore, incurs huge manufacturing costs.

This conventional steam trap operates slowly and spends much time opening/closing a through-hole, thereby causing a loss of steam in large amounts.

For instance, Patent Document 1 described below discloses a "steam trap".

A steam trap according to Patent Document 1 described below which includes a body having an inflow port and a discharge port for allowing condensate water and steam to flow in and out, a cover, as a fixing member, coupled to the body, and a bellows formed in the body for operating expansion and contraction, includes a fixing plate coupled in the body and formed with a bolt hole, the bellows coupled to the bolt hole of the fixing plate to expand and contract, a plug formed at one end of the bellows, an orifice for discharging the condensate water and steam by means of operation of the plug, and a storage formed in the lower portion of the body for storing the condensate water.

Patent Document 2 described below discloses a "steam trap".

A steam trap according to Patent Document 2 which has an inflow port and a discharge port, includes a body having an inflow port and a discharge port for allowing condensate water and steam to flow in and out, a cover coupled to the body by a bolt, and an operating body formed in the body for opening/closing an orifice, and the condensate water or steam flowing in the body of the steam trap is discharged through a drain, the drain is formed separately from the body to prevent the high temperature heat of the body from being delivered to the drain, the discharge port and the body is coupled with a thermal insulation packing between them to enhance thermal insulation, the drain and the body is coupled with the thermal insulation packing between them to enhance thermal insulation and to heat efficiency, and the operating body for opening/closing the orifice includes any one of the float, bellows or bimetal.

However, because a steam trap according to related arts needs to have a storing space for storing condensate water, the overall size (or volume) of the steam trap increases, and the steam trap needs to be vertically limitedly installed, and because condensate water is stored inside, the steam trap may be broken or damaged due to rupture that happens in the winter, and because an orifice for discharging the condensate water needs to be formed, this causes difficulty in manufacturing the steam trap and incurs large amounts of manufacturing costs.

DETAILED DESCRIPTION OF THE INVENTION

Technical Problem

As a means to solve the problems described above, the purpose of the present invention is to provide a bellows-type steam trap which opens/closes a bellows by means of the latent heat of steam by enclosing the bellows consisting of a soft member causing volume changes, at the outer side of a stiff member having small volume changes.

Another purpose of the present inventions is to provide a bellows-type steam trap which does not store steam inside of it so as to prevent rupture in the winter.

Yet another purpose of the present invention is to provide a bellows-type steam trap which may be installed horizontally or vertically depending on the needs.

Technical Solution

As a means to solve the problems described above, a bellows-type steam trap according to the present invention includes a steam trap body having an inflow port formed at one side thereof to connect to an inflow pipe, a discharge port formed at the other side thereof to connect to a discharge pipe, and a channel formed between the inflow port and the discharge port to allow steam to pass; a valve body, installed at the steam trap body, for expanding or contracting to allow the channel to open/close, and the valve body expands or contracts by means of the latent heat of the steam flowing into the channel such that the channel may open/close.

The valve body includes a cylinder-shaped stiff member consisting of stiff materials having small volume changes; a bellows consisting of a soft member so as to easily cause volume changes at the outer side of the stiff member; an upper flange fixed to one side of the bellows; a lower flange fixed to the other side of the bellows.

The bellows builds in the stiff member so as to reduce volume of the expanding inner space thereof, and liquid is accepted between the stiff member and the bellows so as to minimize the expansion of the bellows.

The valve body includes a stainless filter to filter out particles more than or equal to 0.7 mm contained in the steam passing through the channel.

The valve body includes a cap joined to the steam trap body so as to be stably equipped at the channel; a spring installed between the valve body and the cap such that the valve body may be elastically installed at the channel.

Advantageous Effects

As described above, a bellows-type steam trap according to the present invention includes a solid stiff member 31 which has small volume changes and is built in the bellows so as to reduce volume changes (or expansion amounts) of the bellows. This makes it possible to reduce the failures or damages of the valve body and to block a channel more rapidly. Additionally, because no condensate water, steam, gas etc. are left, the steam trap is prevented from rupturing in the winter, and because the steam trap has a simple structure, it is easy to maintain and repair the steam trap and the manufacturing costs are reduced.

BRIEF DESCRIPTION OF THE INVENTION

PREFERRED EMBODIMENTS OF THE INVENTION

The present invention is directed to providing a bellows-type steam trap that includes a steam trap body having an inflow port formed at one side thereof to connect to an inflow pipe, a discharge port formed at the other side thereof to connect to a discharge pipe, and a channel formed between the inflow port and the discharge port to allow steam to pass; a valve body installed at the steam trap body for expanding and contracting to allow the channel to open/close, and the valve body expands or contracts by means of latent heat of the steam flowing into the channel such that the channel may open/close.

Embodiments of the Invention

Hereunder, by reference to the accompanying drawings, a bellows-type steam trap according to preferred embodiments of the present invention will be described in detail.

Figure 1:
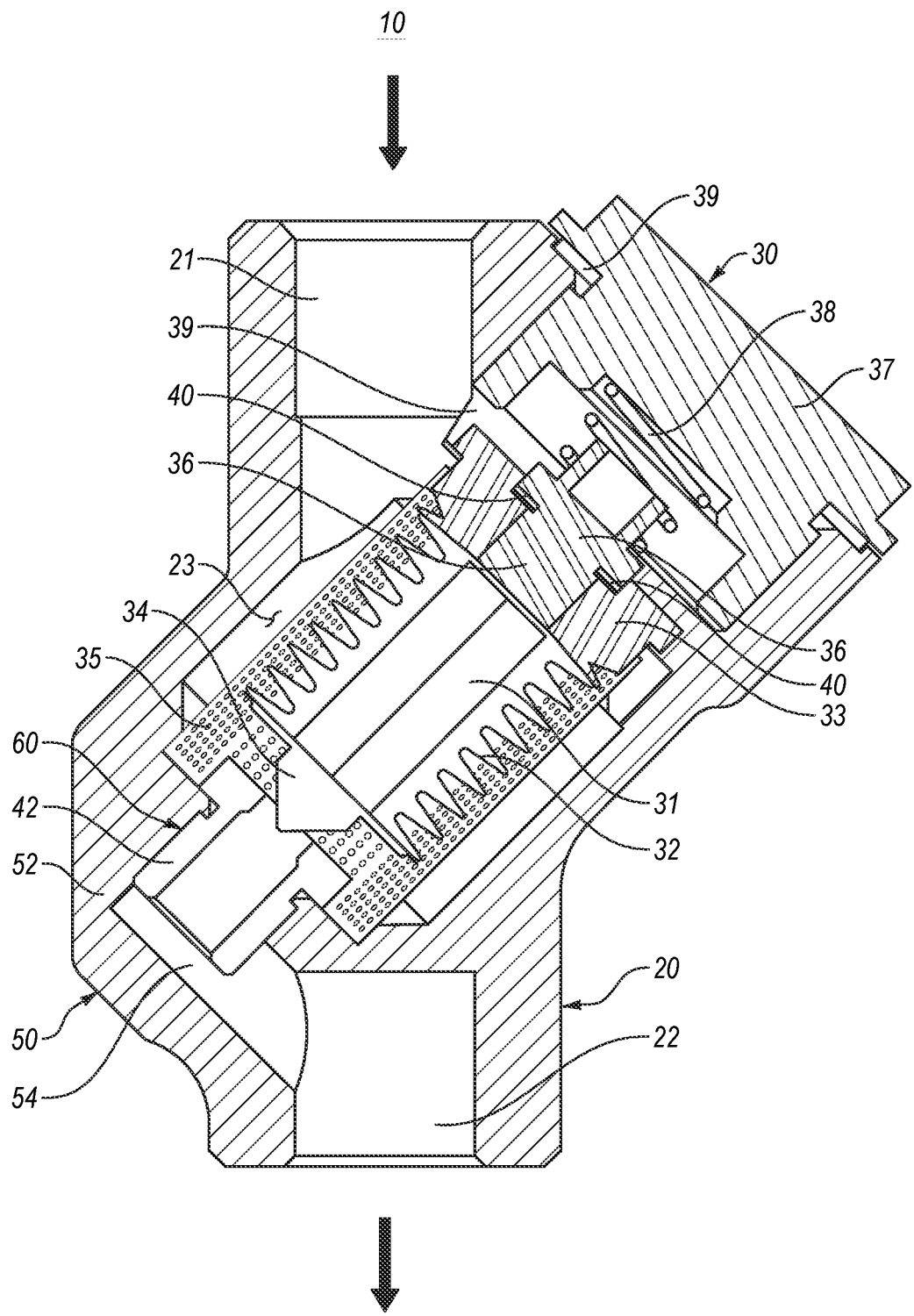
FIG. 1 is a sectional view illustrating a bellows-type steam trap according to preferred embodiments of the present invention.
Figure 2:
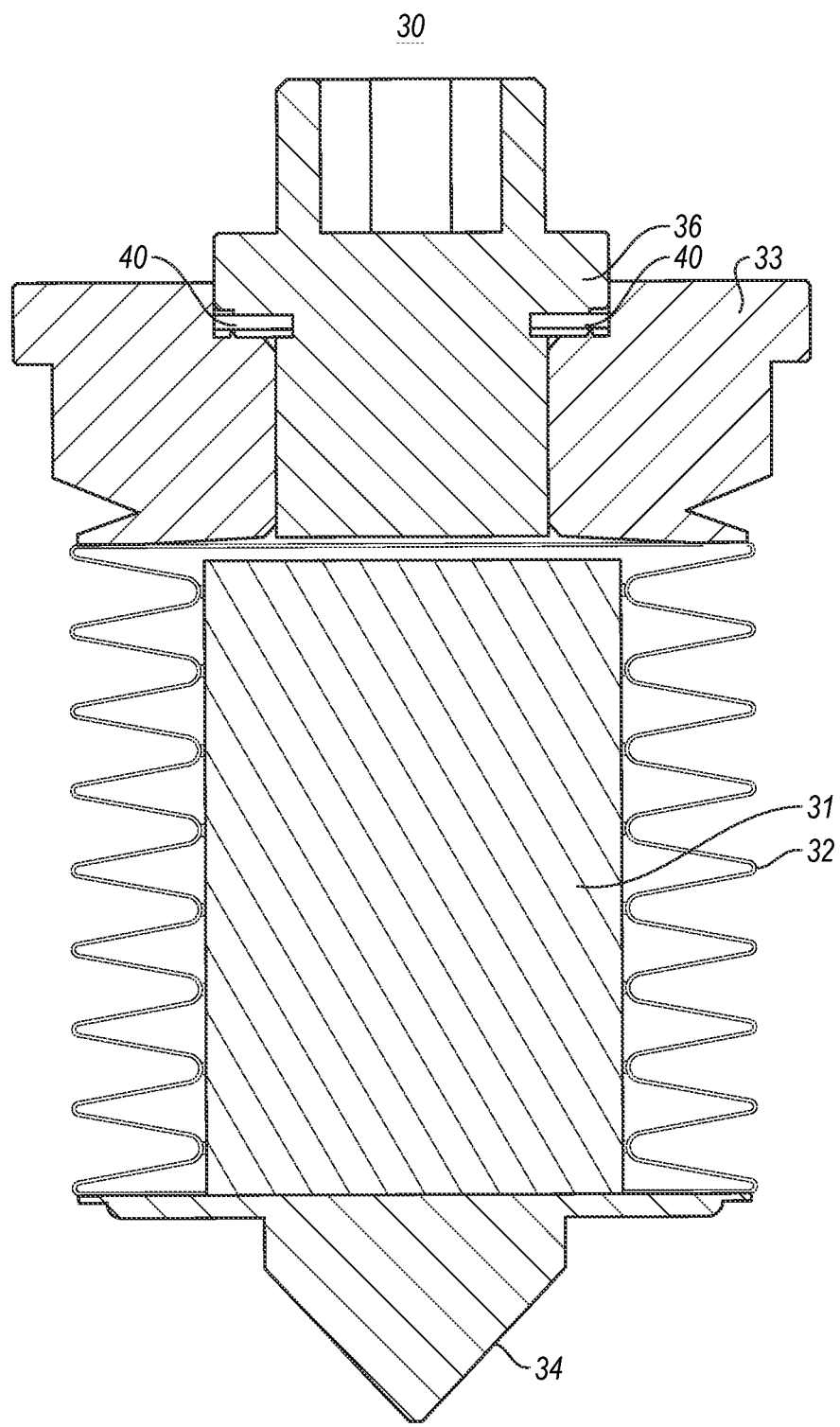
FIG. 2 is an enlarged sectional view illustrating a part of a bellows-type steam trap according to preferred embodiments of the present invention.

FIG. 1 is a sectional view illustrating a bellows-type steam trap according to preferred embodiments of the present invention, and FIG. 2 is an enlarged sectional view illustrating a part of a bellows-type steam trap according to preferred embodiments of the present invention.

A bellows-type steam trap 10, according to preferred embodiments of the present invention, includes a steam trap body 20 which has an inflow port 21 formed at one side thereof to connect to an inflow pipe, a discharge port 22 formed at the other side thereof to connect to a discharge pipe, and a channel 23 formed between the inflow port 21 and the discharge port 22 to allow steam to pass, and includes a valve body 30 which is installed at the steam trap body 20 for expanding and contracting to allow the channel to open/close.

A bellows-type steam trap according to embodiments of the present invention is capable of reducing inner volume such that the expansion or contraction of a bellows 32 installed at an outer side may be minimized, and that the bellows 32 is allowed to open/close by means of steam or condensate water.

A bellows-type steam trap according to embodiments of the present invention builds in a cylinder-shaped stiff member 31 consisting of solid such as metal or synthetic resin materials which may withstand temperatures more than or equal to 240° C. such that the expansion and contraction of the bellows 32 may be minimized, and liquid is accepted between the stiff member 31 and the bellows 32, and the expansion ability of the liquid is suppressed or declined such that the bellows may be prevented from being damaged or broken.

As illustrated in FIGS. 1 and 2, a steam trap 10 according to the present invention is installed at a pipe (invisible) etc. for discharging steam, condensate water, gas etc. of a boiler etc., and the steam trap 10 includes the steam trap body 20 installed to connect to the pipe, and the valve body 30 installed to open/close the channel 23 formed in the steam trap body 20.

The steam trap body 20 has the inflow port 21 formed at one side thereof and the discharge port 22 formed at the other side thereof so as to connect to the pipe, and has the channel 23 formed between the inflow port 21 and the discharge port 22 to allow steam, condensate water, gas etc. to pass.

The steam trap body 20 has the valve body 30 for opening/closing the channel 23. This valve body 30 opens/closes the channel 23 by means of the bellows 32, consisting of soft stainless materials, installed at the outer side of the stiff member 31 consisting of solid.

The valve body 30 includes the cylinder-shaped stiff member 31 having a certain diameter and a certain length, and the bellows 32 consisting of elasticible stainless materials at the outer side of the stiff member 31.

The stiff member 31 is equipped inside the bellows 32, and the elasticible bellows 32 is installed at the outer side of the stiff member 31. The stiff member 31 consists of metal materials having small volume. This is not to affect the expansion or contraction of the bellows 32.

That is, the stiff member 31 consisting of solid such as metals does not cause changes in volume when expanding or contracting happens by means of steam or condensate water etc. such that the expansion or contraction of the bellows 32 may be suppressed (reduced).

When the bellows 32 expands or contracts, such a stiff member 31 does not increase changes, caused by expansion or contraction of the bellows 32 but keeps changes, caused by expansion or contraction of the bellows 32, to a minimum by reducing the inner space of the bellows 32.

The bellows 32 consists of stainless materials, and has a continuous zigzag shape such that expansion or contraction may happen smoothly.

Further, the stiff member 31 is built in the bellows 32, and that is, the stiff member 31 is accepted inside the bellows 32. This leads to a reduction in changes caused by the expansion or contraction of the bellows 32.

Further, the stiff member 31 is equipped inside the bellows 32, and liquid may be accepted between the stiff member 31 and the bellows 32. Such liquid is heated up by condensate water, steam, gas flowing into the channel 23 at the time of expanding or contracting the bellows 32 to expand the bellows 32.

The bellows 32 consisting of stainless materials is heated up by high temperature gas, condensate water, steam flowing into the channel 23 to expand or contract (or to be elasticible).

That is, the bellows 32 is expanded by the latent heat of gas, condensate water, steam etc. to close the channel, and is contracted by means of self-cooling to open the channel.

An upper flange 33 is fixed to one side of the bellows 32, and a lower flange 34 is fixed to the other side of the bellows 32. The upper flange 33 and the lower flange 34 are respectively fixed correspondingly to the upper side and the lower side of the stiff member 31.

A stainless filter 35 is installed at the lower flange 34 so as to filter out foreign particulate materials contained in steam, condensate water, gas etc. passing through the channel 23. The stainless filter 35 is installed to filter out particles more than or equal to 0.7 mm.

Further, a bolt 36 is joined to the upper flange 33 such that the stiff member 31 closely adheres to the lower flange 34, and a cap 37 is joined to the steam trap body 20 such that the bellows 32 closely adhere to the channel 23.

A spring 38 is installed between the bolt 36 and the cap 37 such that the bellows 32 is mounted on the channel 23, and a washer 39 is installed, at the outer side of the upper flange 33 and the bolt 36, between the upper flange 33 and the cap 37.

Further, a gasket 40 is installed between the upper flange 33 and the bolt 36, the channel 23 and the upper flange 33, the channel 23 and the stainless filter 35 so as to prevent steam, condensate water, gas, etc. from leaking.

Hereunder, the coupling relationship of a bellows-type steam trap according to preferred embodiments of the present invention will be described in detail.

A bellows-type steam trap according to preferred embodiments of the present invention is expanded by the latent heat of steam, condensate water, gas etc. passing through a channel 23 to close the channel 23, and when the latent heat of steam, condensate water, gas etc. is not applied, the bellows 32 itself cools to open the channel 23.

A bellows-type steam trap according to preferred embodiments of the present invention includes a steam trap body 20 having the channel 23 formed between an inflow port 21 and a discharge port 22, and a valve body 30 installed at the steam trap body 20 for opening/closing the channel 23.

The steam trap body 20 has the inflow port 21 formed at one side thereof and the discharge port 22 at the other side thereof so as to connect to a pipe (invisible), and has the channel 23 formed between the inflow port 21 and the discharge port 22 so as to discharge steam, condensate water, gas etc.

The valve body 30 consists of a cylinder-shaped stiff member 31 having a certain diameter and a certain length, an elasticible bellows 32 at the outer side of the stiff member 31, and an upper flange 33 and a lower flange 34 fixing the stiff member 31 and the bellows 32 at both sides, and includes a cap 37 coupling the valve body 30 to the steam trap body 20.

The stiff member 31 is to reduce amounts of changes (or expansion amounts) caused by the elasticity of the bellows 32 by reducing the inner space of the bellows 32. Such a stiff member 31 consists of solid such as metal or synthetic resin materials which may withstand temperatures more than or equal to 240° C. to prevent changes in volume. More preferably, the stiff member 31 may consist of solid such as Teflon, ceramics etc.

A bellows 32 consisting of soft synthetic resin is installed at the outer side of the stiff member 31. As illustrated in FIGS. 1 and 2, the bellows 32 is configured to enclose the outer surface of the stiff member 31.

The upper flange 33 is installed at one side of the bellows 32 in the length direction thereof, and the lower flange 34 is installed at the other side of the bellows 32 in the length direction thereof. The upper flange 33 and the lower flange 34 keep the state of the stiff member 31 and the bellows 32 being installed stable.

That is, the upper flange 33 and the lower flange 34 are installed at both ends of the bellows 32 such that the state of the stiff member 31 and the bellows 32 being installed is kept stable.

Further, a stainless filter 35 for filtering out particulate materials such as steam, condensate water, gas etc. is installed at one side of the lower flange 34, and such a stainless filter 35 is installed at the discharge port 22 of the channel 23 to filter out particles more than or equal to 0.7 mm contained in steam, condensate water, gas etc. thereby preventing the channels of pipes etc. from being blocked.

A bolt 36 is joined to the upper flange 33, and the cap 37 is joined to the steam trap body 20 at the outer side of the bolt 36, i.e. at the upper portion of FIG. 1, so as to install the bellows 32 and the flanges (33, 34) in a stable manner.

A spring 38 is installed between the bolt 36 and the cap 37 supporting the bellows 32 so as to react to sudden pressure changes in a boiler etc. such that the bellows 32 is elastically supported.

Further, a washer 39 is installed between the upper flange 33 and the cap 37, and the washer 39 allows the bellows 32 to be mounted inside the cap 37.

Further, a gasket 40 is installed at the upper flange 33 and the bolt 36, the steam trap body 20 and the cap 37, the steam trap body 20 and the stainless filter 35 etc., so as to prevent steam, condensate water, gas etc. from leaking.

Hereunder, by reference to FIGS. 1 to 4, a method of operating a bellows-type steam trap according to preferred embodiments of the present invention will be described in detail.

A bellows-type steam trap according to embodiments of the present invention is installed at the portions of a boiler (invisible) etc. at which steam, condensate water, gas etc. are discharged, and the channel 23 is kept open usually.

That is, when a boiler etc. operates, the bellows 32 is kept contracted until pressure reaches a certain level, and in this case, condensate water or gas etc. generated by the boiler etc. is discharged smoothly through the channel 23.

The steam trap body 20 has a recessed portion 54 formed at a portion of an inner wall 52 of the steam trap body 20 such that the recessed portion 54 receives a lower end portion 60 of the valve body 30 including a valve seat 42 installed at the discharge port side 50 of the steam trap body 20, adjacent the discharge port 22. When the pressure of the boiler etc. reaches a certain level, the bellows 32 expands by the latent heat of condensate water, gas etc., and this makes the lower flange 34 closely adheres to the valve seat 42 such that the channel 23 is blocked.

In this case, because the cylinder-shaped stiff member 31 is built in the bellows 3, the expansion of the bellows 32 is minimized compared to the case where nothing is inside the bellows 32. That is, the bellows 32 is expanded by the high temperature steam, condensate water, gas etc. discharged, and because the bellows 32 changes depending on expansion, the changes in the bellows 32 are reduced compared to the case where the stiff member 31 is not built in.

The reason why the changes depending on the expansion of the bellows 32 are reduced is that the stiff member 31 consisting of solid having small volume changes is built in the bellows 32.

Further, because the bellows 32 builds in the stiff member 31, the channel 23 may be closed (shut) more rapidly even though the changes in the expansion are small.

Meanwhile, when steam, condensate water, gas etc. do not pass through the channel 23, the bellows 32 cools and returns to the initial state thereof, and this leads the channel 23 to open again.

As described above, because a bellows-type steam trap according to the present invention is vertically installed, condensate water, gas etc. are not left inside the channel 23, and this leads to prevention of rupture in the winter.

That is, the channel 23 is kept open all the time, and condensate water etc. is not left even though outside temperature changes. This leads to preventing steam trap 10 from rupturing and reducing the risk of pipe rupture in the winter.

Figure 3:
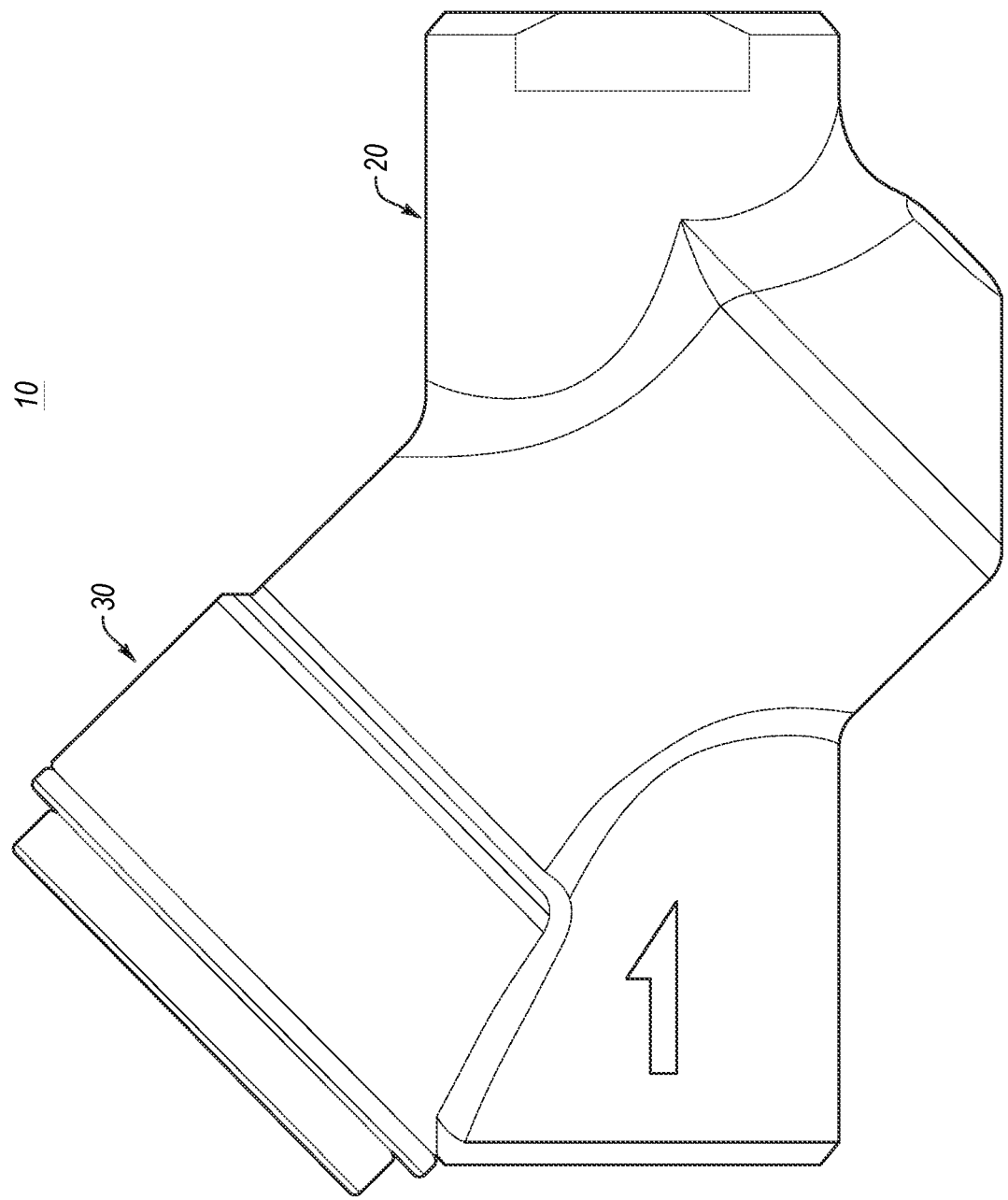
FIG. 3 is a view briefly illustrating a bellows-type steam trap, according to preferred embodiments of the present invention, installed horizontally.
Figure 4:
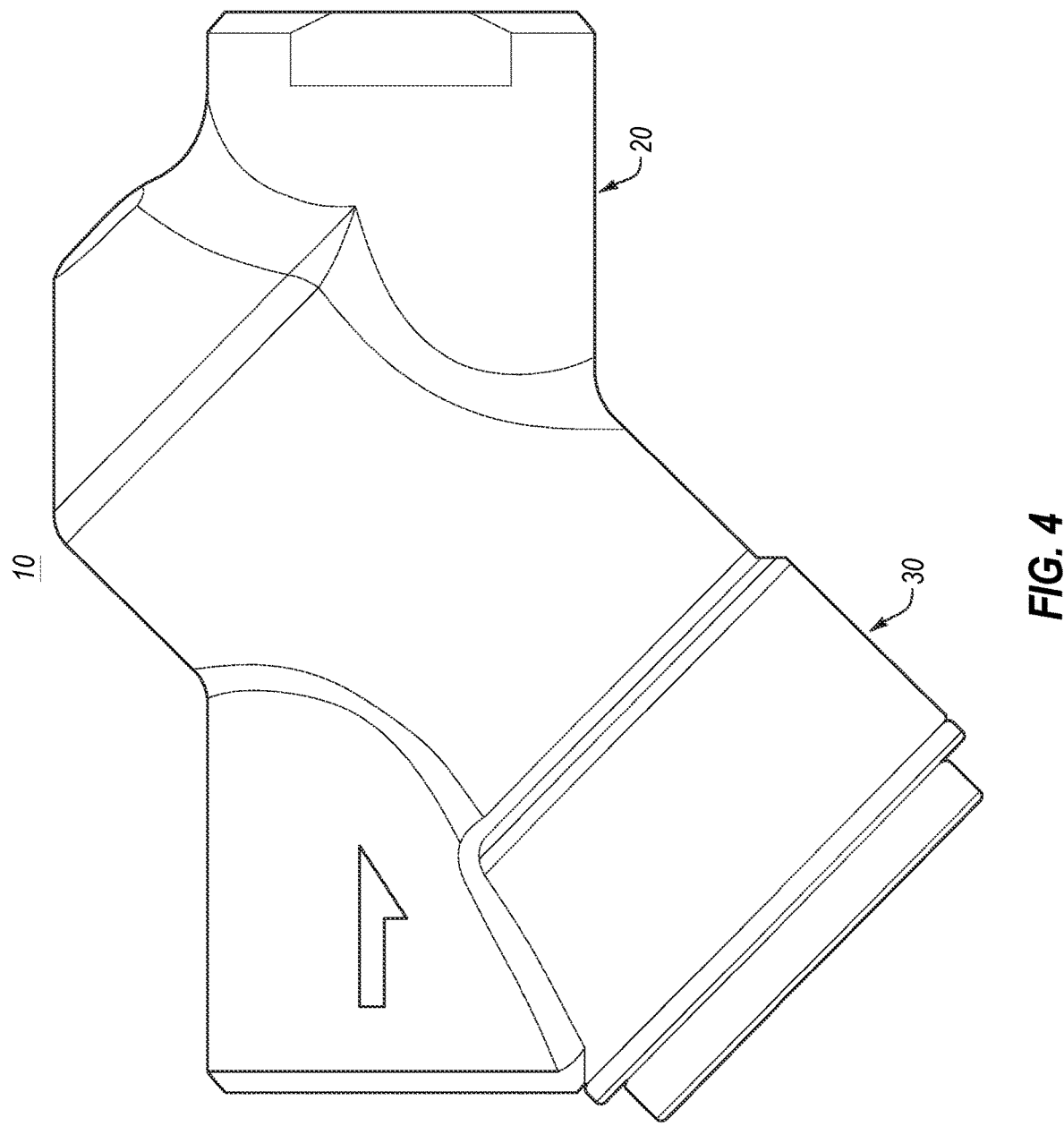
FIG. 4 is a view briefly illustrating a bellows-type steam trap, according to preferred embodiments of the present invention, overturned and installed horizontally.

FIG. 3 is a view briefly illustrating a bellows-type steam trap, according to preferred embodiments of the present invention, installed horizontally, and FIG. 4 is a view briefly illustrating a bellows-type steam trap, according to preferred embodiments of the present invention, overturned and installed horizontally.

As illustrated in FIGS. 3 and 4, the steam trap 10 may be installed horizontally and installed horizontally in the state where the valve body 30 faces toward the bottom in an overturned manner.

As in FIG. 3, the channel 23 may store more amounts of condensate water when the steam trap 10 is installed horizontally, and accordingly, more amounts of condensate water may be discharged compared to the case where the steam trap is installed vertically.

Further, as in FIG. 4, the channel 23 may store more amounts of condensate water when the steam trap 10 is overturned and installed horizontally, and accordingly, more amounts of condensate water may be discharged compared to the case where the steam trap is installed vertically.

While this invention has been described in detail in connection with the embodiments described above, it is to be understood that the invention is not limited to the embodiments and that the invention may be embodied in many different forms within the scope of the invention.

INDUSTRIAL APPLICABILITY

The present invention is capable of automatically opening and closing the channel for condensate water by using the sensible heat of condensate water to discharge only the condensate water, and is applicable to bellows-type steam traps capable of preventing rupture in the winter.

What is claimed:

1. A bellows-type steam trap comprising:
    a steam trap body having an inflow port formed at one side thereof to connect to an inflow pipe, a discharge port formed at the other side thereof to connect to a discharge pipe, and a channel formed between the inflow port and the discharge port to allow steam to pass;
    a valve body, installed in the steam trap body, for expanding or contracting to allow the channel to close or open;
    wherein the valve body expands or contracts by means of latent heat of the steam flowing into the channel such that the channel closes or opens as the valve body expands or contracts,
    wherein the valve body comprises:
        a cylinder-shaped stiff member consisting of stiff materials having small volume changes;
        a bellows consisting of a soft member so as to easily cause volume changes at an outer side of the cylinder-shaped stiff member;
        an upper flange fixed to one side of the bellows: and
        a lower flange fixed to the other side of the bellows;
        wherein the cylinder-shaped stiff member is installed in the bellows so as to reduce volume of the expanding inner space thereof,
        wherein the cylinder-shaped stiff member and the bellows have liquid between them so as to minimize expansion of the bellows and the cylinder-shaped stiff member is entirely solid and the liquid is only between an outer surface of the cylinder-shaped stiff member and an inner surface of the bellows, and
    wherein the inflow port and the discharge port are arranged in a same direction in the steam trap body; the valve body is arranged, in the steam trap body, obliquely with respect to a straight line connecting the inflow port and the discharge port in the steam trap body such that the bellows in the valve body obliquely traverses a flow channel on the straight line connecting the inflow port and the discharge port in the steam trap body; and the steam trap body has a recessed portion formed at a portion of an inner wall of the steam trap body such that the recessed portion of the steam trap body receives a lower end portion of the valve body including a valve seat installed at a discharge port side of the steam trap body, thereby allowing the bellows-type steam trap to be installed horizontally or vertically.

2. A bellows-type steam trap according to claim 1, wherein the valve body comprises a stainless filter to filter out particles more than or equal to 0.7 mm contained in the steam passing through the channel.

3. A bellows-type steam trap according to claim 1, wherein the valve body comprises:
    a cap joined to the steam trap body so as to be stably equipped at the channel; and
    a spring installed between the valve body and the cap such that the valve body may be elastically installed at the channel.

4. A bellows-type steam trap according to claim 1, wherein the flow channel is formed between the inflow port and the discharge port to allow steam to pass through the flow channel, wherein the inflow port and the discharge port are arranged in a same direction in the steam trap body and the valve body is arranged, in the steam trap body, obliquely with respect to the straight line connecting the inflow port and the discharge port in the flow channel.

5. A bellows-type steam trap comprising:
a steam trap body having an inflow port formed at one side thereof to connect to an inflow pipe, a discharge port formed at the other side thereof to be connected to a discharge pipe, and a flow channel formed between the inflow port and the discharge port to allow steam to pass through the flow channel;
a valve body, installed in the steam trap body, for expanding or contracting to allow the channel to close or open,
wherein the valve body comprises:
a cylinder-shaped stiff member consisting of stiff materials having small volume changes;
a bellows consisting of a soft member so as to easily cause volume changes at an outer side of the cylinder-shaped stiff member;
an upper flange fixed to one side of the bellows; and
a lower flange fixed to the other side of the bellows,
wherein the cylinder-shaped stiff member is installed in the bellows so as to reduce volume of the expanding inner space thereof, and wherein the cylinder-shaped stiff member and the bellows have liquid between them so as to minimize expansion of the bellows and the cylinder-shaped stiff member is entirely solid and the liquid is only between an outer surface of the cylinder-shaped stiff member and an inner surface of the bellows,
wherein the inflow port and the discharge port are arranged in a same direction in the steam trap body and the valve body is arranged, in the steam trap body, obliquely with respect to a straight line connecting the inflow port and the discharge port in the steam trap body such that the bellows in the valve body obliquely traverses the flow channel on the straight line connecting the inflow port and the discharge port in the steam trap body, and the steam trap body has a recessed portion formed at a portion of an inner wall of the steam trap body such that the recessed portion of the steam trap body receives a lower end portion of the valve body including a gasket installed at a discharge port side of the steam trap body, thereby allowing the bellows-type steam trap to be installed horizontally or vertically, vertically, and
wherein the valve body expands or contracts by means of latent heat of the steam flowing into the channel such that the channel closes or opens as the valve body expands or contracts.

6. A bellows-type steam trap according to claim 5,
wherein the valve body comprises a stainless filter to filter out particles more than or equal to 0.7 mm contained in the steam passing through the channel.

7. A bellows-type steam trap according to claim 5,
wherein the valve body comprises:
a cap joined to the steam trap body so as to be stably equipped at the channel; and
a spring installed between the valve body and the cap such that the valve body may be elastically installed at the channel.

* * * * *